United States Patent [19]

Safar

[11] 4,306,251
[45] Dec. 15, 1981

[54] DYNAMIC BEAM CURRENT CONTROL

[75] Inventor: Johann Safar, Woodcliff Lake, N.J.

[73] Assignee: North American Philips Corporation, New York, N.Y.

[21] Appl. No.: 152,971

[22] Filed: May 23, 1980

Related U.S. Application Data

[63] Continuation of Ser. No. 6,610, Jan. 26, 1979, abandoned.

[51] Int. Cl.³ .............................................. H04N 5/34
[52] U.S. Cl. ................................................... 358/219
[58] Field of Search ...................... 358/209, 217, 219

[56] References Cited

U.S. PATENT DOCUMENTS

| | | | |
|---|---|---|---|
| 3,102,924 | 9/1963 | Legler | |
| 3,999,011 | 12/1976 | Sato et al. | 358/219 |
| 4,160,277 | 7/1979 | Worsfold | 358/166 |

*Primary Examiner*—Robert L. Richardson
*Attorney, Agent, or Firm*—Thomas A. Briody; William J. Streeter; Edward W. Goodman

[57] ABSTRACT

A dynamic beam current control circuit for a television camera tube features a threshold circuit so that the correction is effected only for large light intensities impinging on the television camera tube. It also features a non-linear circuit which has a characteristic which is in the inverse of the control electrode voltage versus beam current characteristic of the camera tube. This prevents a ghost effect from showing in the display picture.

5 Claims, 2 Drawing Figures

DYNAMIC BEAM CURRENT CONTROL

This is a continuation, of application Ser. No. 6,610, filed Jan. 26, 1979 and now abandoned.

BACKGROUND OF THE INVENTION

The present invention relates to television cameras, and more particularly to dynamic beam current control circuits for said cameras.

A television camera tube has a target which is illuminated by the scene that is viewed by the camera tube. The intensity of the light falling on the target causes an electrical discharge of it. An electron beam sweeps across the target and recharges it to a fixed value. The current that is required to recharge the target plate is proportional to the intensity of the light falling upon the target plate. If the camera tube is viewing a very intense object, the electron beam current may not be sufficient to totally recharge the target plate. This especially occurs when the camera and the viewed object are moving with respect to one another. It causes a visible effect known as "comet tail", which trails a brightly illuminated spot when said motion occurs.

The beam current which flows in the camera tube is a function of the voltage applied to its control electrode. This current traditionally has been a compromise between minimizing a comet tail effect, which requires a large current, and high resolution, which requires a low beam current. If the voltage on the control electrode can vary with the signal current created by the optical image, then the beam current can temporarily and automatically be increased to accomodate local areas of excess light. This technique has been named "dynamic beam current control". Such a beam current control scheme can, and has in the past, been accomplished by connecting the pre-amplified pick-up tube output signal back to the control electrode of the camera tube via ordinary electronic amplifiers. This method however exposes several undesirable side effects which can be annoying when viewing the displayed picture. First propagation delay of the signal through the electronic amplifier leads to a ghost image in the picture. This is due to crosstalk between the control and signal target electrodes within the pick-up tube. Second the control loop tends to be unstable because the control electrode voltage versus cathode beam current characteristic of the pick-up tube is non-linear. Typically it follows a square law.

SUMMARY OF THE BACKGROUND

It is therefore an object of the present invention to provide for dynamic beam current control in a television camera.

It is another object of the present invention to provide dynamic beam current control without a ghost image in the displayed picture.

A further object of the present invention is to provide dynamic beam current control which is stable.

It is yet another object to provide compensation for non-linearities of the electron tube.

In brief, these and other objects are achieved by having a threshold detector in the beam current control circuit. This allows a low beam current for high resolution, yet it supplies a large beam current to those portions of the target plate that have a very large amount of light impinging upon them. A non-linear circuit can be used in the dynamic beam current control circuit to correct for the non-linear voltage versus current characteristic of the camera tube. This provides for a stable feedback loop.

DESCRIPTION OF THE DRAWING

These and other objects, features, and advantages, will become apparent from the following detailed description when taken in conjunction with the drawings in which.

DESCRIPTION OF THE PREFERRED EMBODIMENT

Figure 1:
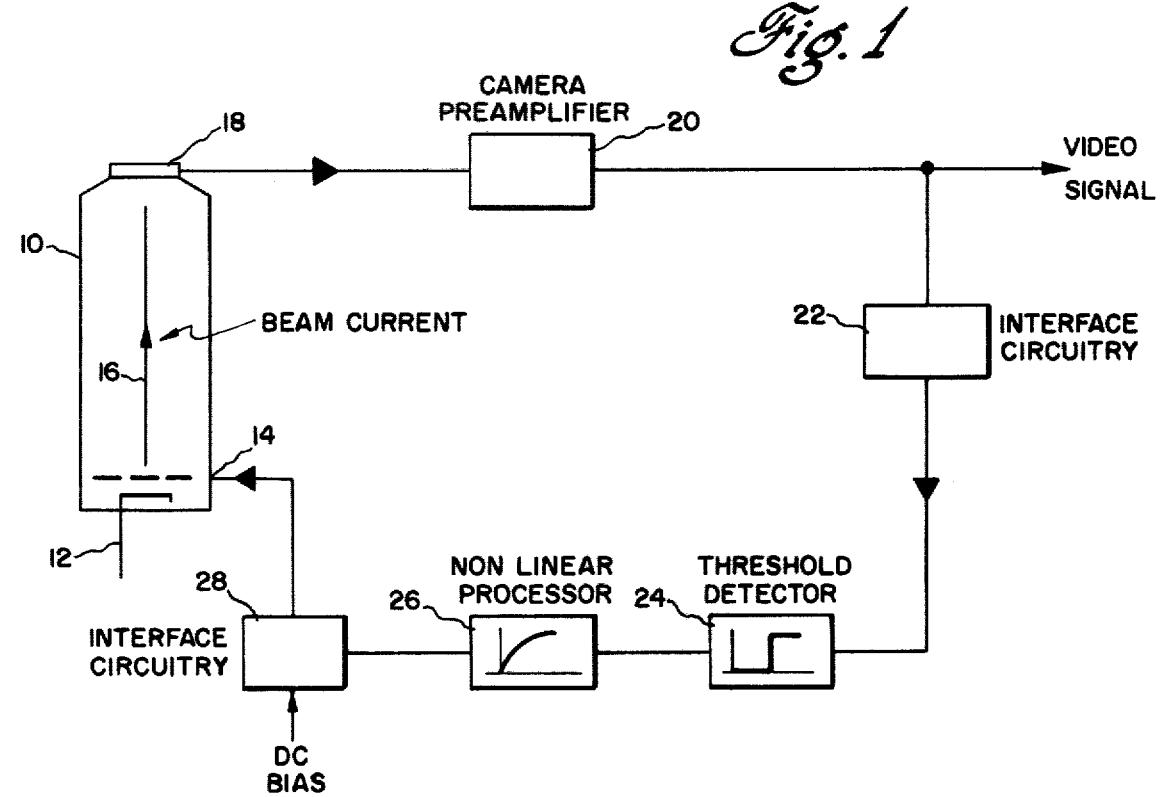
FIG. 1 shows a block diagram of a circuit in accordance with the invention.

FIG. 1 shows a camera tube 10 which has a electron emitting cathode 12. The cathode current is controlled by a control electrode 14. Typically the control voltage on the control electrode 14 versus the cathode current from cathode electrode 12 is square law, i.e. a doubling of the voltage on the control electrode 14 causes a quadrupling of the current from cathode 12. The electron beam 16 impinges upon the inwards facing side of a signal or target electrode 18. The other side of the target 18 receives light from a viewed scene (not shown). The light causes a discharge of the charge stored across target 18 in accordance with the strength of the light falling on a particular point of target 18. The electron beam 16 is swept across target 18 by deflection coils and circuitry (not shown). It recharges the inside of target 18 up to a selected value in accordance with the beam current. The amount of the signal current coming from target 18 is coupled to the preamplifier 20 where it is amplified and then applyed to the remainder of the video circuits within the camera. When a very intense light falls upon the target 18, beam current 16 would normally be insufficient to completely recharge the target, thus giving rise to the comet tail effect.

To overcome this problem, the output of camera preamplifier 20 is coupled to an interface circuit 22, which is a simple D.C. restoration device. In turn, the output of 22 is coupled to a threshold detector 24, which provides an output signal only when its input signal exceeds 100 units of video. Thus, if the input signal equals 150 units, the output signal from threshold detector 24 would be 50 units. A non-linear processing circuit 26 is coupled to the threshold detector 24. Typically the processor 26 has a square root law characteristic to compensate for the square law characteristic of camera tube 10. However other characteristics can be used depending upon the characteristic of camera tube 10. In general it is desired to have the inverse of the characteristic of the camera tube for the characteristic of processor 26. The output of processor 26 is coupled to another interface circuit 28 where the video signal is combined with a D.C. bias current to set the beam current 16 within tube 10. The output of the interface circuit 28 is in turn coupled to the control electrode 14. If desired interface circuit 28 can be coupled to cathode 12.

In operation, it will be seen that ghost images due to crosstalk are eliminated by the use of the threshold circuit 24. This prevents the application of the beam current control signal to the control electrode until an excessive light in the image causes the signal to exceed a preselected threshold value. This value is selected such that the light intensity required to make normal television pictures will be less than the threshold value. Until the video signal reaches this value, the control electrode of the tube 10 receives only a D.C. bias voltage applied by interface circuit 28. Further it will be appreciated that the tendency towards instability is significantly reduced by using a non-linear processor 26 within the circuit.

Figure 2:
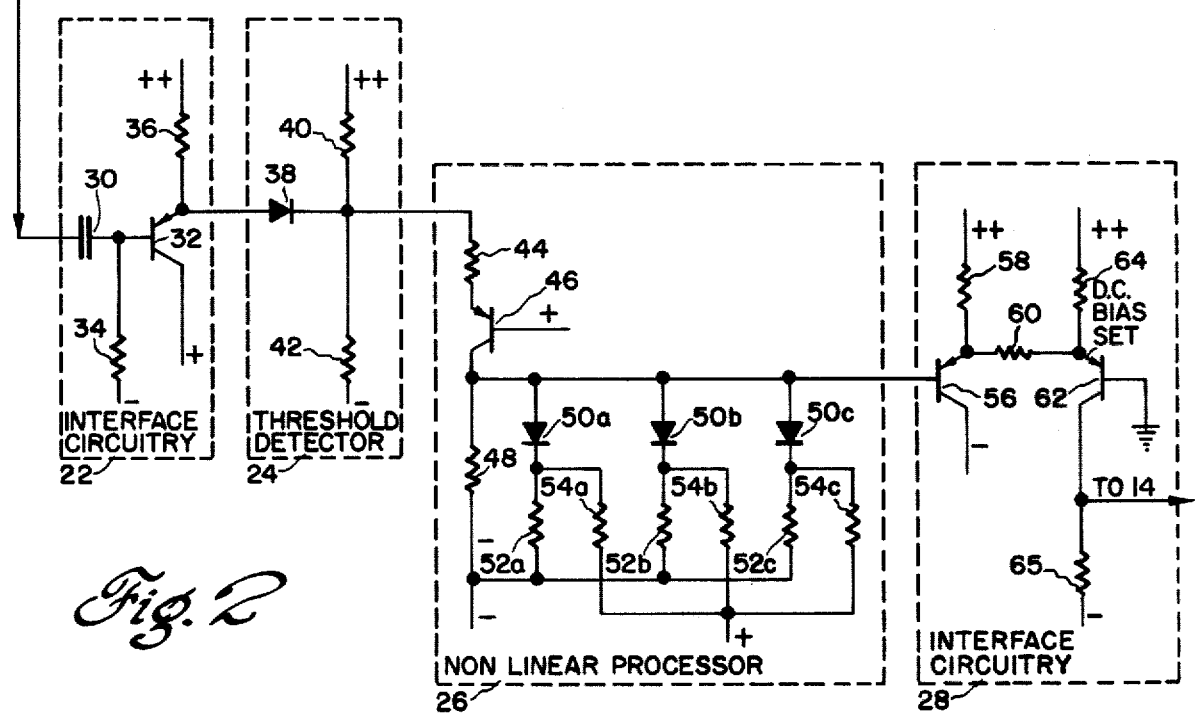
FIG. 2 shows a schematic diagram of some details of the blocks of FIG. 1.

FIG. 2 shows a schematic diagram of some of the details of the circuits of FIG. 1. The output of preamplifier 20 is coupled through a capacitor 30 to the base of emitter follower transistor 32. The base of transistor 32 is biassed by resistor 34 coupled to a source of negative voltage (not shown). A resistor 36 is coupled to a source of positive potential (not shown) and biases the emitter of transistor 32. The collector of transistor 32 is coupled to another source of positive voltage (not shown), and since the previous two bias sources both bias transistor 32 to operate in saturation, the bias at the collector of said transistor determines the D.C. restoration point for the peak black level for positive going video. The threshold detector 24 comprises a diode 38 that receives at its anode the output of transistor 32 and has its cathode coupled to biassing resistors 40 and 42 respectively coupled to positive and negative voltage sources (not shown). The resistors 40 and 42 form a resistive divider that back biases the diode 38, so that only a signal greater than this back bias on the diode 38, which is set at the level required to produce a normal television picture, is feed to the non-linear processor stage 26. If desired resistors 40 and 42 can be replaced by a variable potentiometer. The non-linear processor 26, which is essentially the same as a gamma correction circuit, receives its signal through a resistor 44, which applies it to the emitter of common base transistor 46. At the base of transistor 46 a positive bias voltage is applied. The collector of transistor 46 goes to a collector load resistor 48, which in turn goes to a negative voltage source (not shown). A plurality of diode resistive load networks are connected in parallel with load resistor 48. They comprise diodes 50a, 50b, 50c, and resistors 52a, 52b, and 52c, connected in series with the diodes 50 respectively. Biassing resistors 54a, 54b, and 54c, are coupled to the junctions of diodes 50 and resistors 52 respectively. The other ends of the resistors 54 are coupled to a source of positive potential. They bias each of the diodes 50 at a different point, so that as the input signal becomes stronger, more of the diodes 50 start conducting, thus placing more of the resistors 52 in parallel with the load resistor 48, and thereby reducing the total effective collector load. This causes the non-linear characteristic that is desired for this processor. The interface circuit 28 comprises an emitter follower transistor 56 having a bias resistor 58 coupled to its emitter and a source of negative potential (not shown) coupled to its collector. A resistor 60 applies the signal from the emitter of transistor 56 to the emitter of a transistor 62 operating in a grounded emitter configuration. A resistor 64 is coupled to a source of positive potential (not shown) and sets D.C. bias on transistor 62, which in turn sets the beam current of tube 10. The collector of transistor 62 is coupled to a load resistor 65, which in turn is coupled to a source of negative potential (not shown). The junction of transistor 62 and resistor 65 is coupled to the control electrode 14 of the tube 10, although as previously mentioned, it can be coupled to cathode 12.

It is appreciated that many other embodiments are possible without departing from the spirit and scope of the invention.

I claim:

1. A dynamic beam current control circuit for use with a television camera tube having a target and an electrode associated therewith, and a control electrode for controlling the beam current which flows in the tube, said circuit comprising a threshold detector having input means for receiving a signal from said target electrode and an output, and a non-linear processing circuit coupled to said output of said threshold detector for supplying a control signal to said control electrode, characterized in that said non-linear processing circuit has an input-to-output characteristic that is the inverse of the control electrode voltage versus the beam current characteristic of said camera tube.

2. A circuit as claimed in claim 1, wherein said non-linear processing circuit has a square root input-to-output characteristic.

3. A circuit as claimed in claim 1 or 2, wherein said non-linear processing circuit comprises a first resistor, a plurality of series circuits, each comprising a diode and a resistor, coupled in parallel with said first resistor, and mean or applying bias to said series circuits.

4. A circuit as claimed in claims 1 or 2, wherein said threshold detector comprises a back-biased diode.

5. A circuit as claimed in claims 1 or 2, which further comprises an interface circuit coupled between said non-linear processing circuit and said control electrode of said camera tube whereby said interface circuit combines the output of said non-linear processing circuit with a D.C. bias for setting the beam current within said camera tube.

* * * * *